United States Patent
Ito et al.

(10) Patent No.: US 8,564,142 B2
(45) Date of Patent: Oct. 22, 2013

(54) RADIATION CURABLE INK JET INK COMPOSITION AND INK JET RECORDING METHOD

(75) Inventors: Jun Ito, Shimosuwa-machi (JP); Hiroki Nakane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 13/307,075

(22) Filed: Nov. 30, 2011

(65) Prior Publication Data

US 2012/0133059 A1 May 31, 2012

(30) Foreign Application Priority Data

Nov. 30, 2010 (JP) .................................. 2010-267144
Nov. 30, 2010 (JP) .................................. 2010-267335

(51) Int. Cl.
*H01L 23/29* (2006.01)

(52) U.S. Cl.
USPC .................... 257/788; 257/587; 257/E21.502; 522/167

(58) Field of Classification Search
USPC .................... 257/587, 788; 347/20, 100, 102; 522/26, 44, 36, 64, 81, 79, 167
See application file for complete search history.

(56) References Cited

U.S. PATENT DOCUMENTS 7,322,688 B2 * 1/2008 Woudenberg ................. 347/100

FOREIGN PATENT DOCUMENTS

| JP | 2539839 | | 4/1997 |
|----|---------|---|--------|
| JP | 11/274335 | A | 10/1999 |
| JP | 2000-332376 | A | 11/2000 |
| JP | 2003-273172 | A | 9/2003 |
| JP | 2006-021479 | A | 1/2006 |
| JP | 2007-527459 | A | 9/2007 |
| JP | 2009-096910 | A | 5/2009 |
| JP | 2009-128864 | A | 6/2009 |
| WO | 2005-091811 | A2 | 10/2005 |

\* cited by examiner

*Primary Examiner* — Dung A. Le

(74) *Attorney, Agent, or Firm* — Nutter McClennen & Fish LLP; John J. Penny, V

(57) ABSTRACT

The invention provides a radiation curable ink jet ink composition including: a monomer equal to or more than 20% by mass and equal to or less than 50% by mass with respect to the total mass of the ink composition, which is represented by the following formula (I); and N-vinylcaprolactam equal to or more than 5% by mass and equal to or less than 15% by mass with respect to the total mass of the ink composition:

$$CH_2=CR^1-COOR^2-O-CH=CH-R^3 \quad (I)$$

wherein, $R^1$ is a hydrogen atom or a methyl group, $R^2$ is a divalent organic residue having 2 to 20 carbon atoms, and $R^3$ is a hydrogen atom or monovalent organic residue having 1 to 11 carbon atoms.

8 Claims, No Drawings

RADIATION CURABLE INK JET INK COMPOSITION AND INK JET RECORDING METHOD

CROSS REFERENCES TO RELATED APPLICATIONS

The entire disclosure of Japanese Patent Application No. 2010-267335, filed Nov. 30, 2010 and 2010-267144, filed Nov. 30, 2010 are expressly incorporated by reference herein.

BACKGROUND

1. Technical Field

The present invention relates to a radiation curable ink jet ink composition, a recorded matter, and an ink jet recording method.

2. Related Art

In the related art, various methods have been used as a recording method for forming an image on a recording medium based on an image data signal. Of these, since the ink jet method includes ejecting an ink only into a required image portion using an inexpensive apparatus and directly forming an image on a recording medium, the ink can be efficiently used and running costs are low.

In recent years, since an image having good water resistance, solvent resistance and scratch resistance is formed on the surface of a recording medium, in the ink jet recording method, a radiation curable ink jet ink composition is used which is cured by the irradiation of radiation rays.

On the other hand, in recent years, an electronic component (Integrated Circuit (IC) package) which packages a semiconductor chip (IC chip) or the like is used in various apparatuses, and marking where characters, symbols, or logo marks are printed is generally performed on such electronic components. Therefore, a printing technique where a marking suitable for the electronic components is performed is required.

For example, JP-A-11-274335 discloses a marking method where an ink is attached by the ink jet type with respect to electronic components such as IC chip and is fixed to the electronic components by irradiation with ultraviolet rays. JP-A-2000-332376 discloses a marking method where a lot number is printed by the ink jet type on a substrate portion which removes the edge portion of a substrate where a number of bare chips are displaced.

For example, JP-A-2006-21479 discloses an ink jet recording method of production of a printed wiring board where the integrated light amount and luminance of irradiated ultraviolet rays is in a specific range such that the ink containing titanium dioxide is cured in maximum ink film thickness of 10 to 30 μm. JP-T-2007-527459 discloses an ink jet printing method which includes a process ejecting and marking an ultraviolet curable ink containing a coloring agent, a photopolymerization initiator, and an epoxy reagent from an ink jet print on a printed circuit board, and a process of exposing the marking with ultraviolet rays after at least 2 seconds.

For example, the specification of Japanese Utility Model No. 2,539,839 discloses a mold IC package where coating is performed on an IC package, and the marking is performed. JP-A-2003-273172 discloses a method where marking is performed on the location of a defective IC chip on a wafer having plural IC chips.

However, the techniques described in JP-A-11-274335, 2000-332376, 2006-21479, JP-T-2007-527459, the specification of Japanese Utility Model No. 2,539,839, JP-A-2003-273172 all deteriorate in at least one of scratch resistance, adhesiveness, and alcohol resistance or have room for improvement. Therefore, there is a problem where it is difficult to apply the related marking method to precision electronic components.

SUMMARY

An advantage of some aspects of the invention is a radiation curable ink jet ink composition having excellent scratch resistance, adhesiveness, and alcohol resistance, and a recorded matter using the same, and an ink jet recording method.

Techniques described in JP-A-11-274335, 2000-332376, 2006-21479, JP-T-2007-527459, the specification of Japanese Utility Model No. 2,539,839, JP-A-2003-273172 all deteriorates at least one of curability of the ink, scratch resistance of the cured ink, and visibility of the recorded image, or have room for improvement. Therefore, there is a problem where it is difficult to apply the related marking method to precision electronic components.

An advantage of some aspects of the invention is an ultraviolet curable ink jet ink composition having excellent curability, scratch resistance and visibility, and a recorded matter using the same and ink jet recording method.

The inventors investigated the problems and found that a radiation curable ink jet ink composition (hereinafter, simply referred to as "ink composition") containing a compound having a vinyl group and a (meth)acryl group in the molecule, and N-vinylcaprolactam in predetermined amounts respectively, which has excellent scratch resistance, adhesiveness and alcohol resistance, can be obtained, thus completing the invention.

In other words, a first aspect of the invention is as follows.

[1] A radiation curable ink jet ink composition including a monomer equal to or more than 20% by mass and equal to or less than 50% by mass with respect to the total mass of the ink composition, which is represented by the following formula (I); and N-vinylcaprolactam equal to or more than 5% by mass and equal to or less than 15% by mass with respect to the total mass of the ink composition:

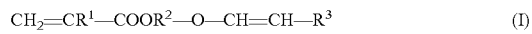

$$CH_2=CR^1-COOR^2-O-CH=CH-R^3 \qquad (I)$$

wherein, $R^1$ is a hydrogen atom or a methyl group, $R^2$ is a divalent organic residue having 2 to 20 carbon atoms, and $R^3$ is a hydrogen atom or monovalent organic residue having 1 to 11 carbon atoms.

[2] The radiation curable ink jet ink composition described in [1], wherein the monomer is 2-(vinyloxyethoxy)ethyl acrylate.

[3] The radiation curable ink jet ink composition described in [1] or [2], wherein the radiation curable ink jet ink composition further contains a polyfunctional acrylate equal to or more than 5% by mass and equal to or less than 20% by mass with respect to the total mass of the ink composition.

[4] The radiation curable ink jet ink composition described in [3], wherein the polyfunctional acrylate is a polyfunctional acrylate having a pentaerythritol skeleton.

[5] The radiation curable ink jet ink composition described in any one of [1] to [4], wherein the radiation curable ink jet ink composition further contains a photopolymerization initiator.

[6] The radiation curable ink jet ink composition described in any one of [1] to [5], wherein a recording medium to which the ink composition is attached is a package substrate or semiconductor substrate.

[7] A recorded matter including: the package substrate or semiconductor substrate as a recording medium; and a cured material of the radiation curable ink jet ink composition described in any one of [1] to [6] recorded on the package substrate or the semiconductor substrate.

[8] An ink jet recording method including: ejecting the radiation curable ink jet ink composition described in any one of [1] to [6] onto a recording medium; and curing the ejected ink composition by irradiation with active radiation rays having an emission peak wavelength in a range of equal to or longer than 350 nm and equal to or shorter than 400 nm.

Also, the inventors investigated the problems and found that an ultraviolet curable ink jet ink composition (hereinafter, simply referred to as "ink composition") containing a polymerizable compound, a photopolymerization initiator, and titanium oxide having a median size and content in a predetermined range, which is used for recording the ink composition on the package substrate or semiconductor substrate as a recording medium can solve the problems, thus completing the invention.

In other words, a second aspect of the invention is as follows.

[1] An ultraviolet curable ink jet ink composition including a polymerizable compound, a photopolymerization initiator, and titanium oxide, which is used for recording a image on the package substrate or semiconductor substrate as a recording medium, wherein the titanium oxide has a median size of 260 nm or lower by a dynamic light scattering method, and has a content of 12 to 18% by mass with respect to the total mass of the ink composition.

[2] The ultraviolet curable ink jet ink composition described in [1], wherein the polymerizable compound includes N-vinylcaprolactam, in which the content of N-vinylcaprolactam is 5 to 25% by mass with respect to the total mass of the ink composition.

[3] The ultraviolet curable ink jet ink composition described in [1] or [2], wherein the photopolymerization initiator includes an acylphosphine oxide compound, in which the content of the acylphosphine oxide compound is 7 to 15% by mass with respect to the total mass of the ink composition.

[4] The ultraviolet curable ink jet ink composition described in any one of [1] to [3], wherein the composition can be irradiated and cured by irradiation with ultraviolet rays of an emission peak wavelength in a range of 365 to 420 nm in an irradiation energy of 500 mJ/cm² or lower.

[5] A recorded matter including: the package substrate or semiconductor substrate as a recording medium; and a cured material of ultraviolet curable ink jet ink composition described in any one of [1] to [4] recorded on the package substrate or the semiconductor substrate.

[6] An ink jet recording method including: ejecting the ultraviolet curable ink jet ink composition described in any one of [1] to [4] onto a recording medium; and curing the ejected ink composition by irradiation with ultraviolet rays having an emission peak wavelength in a range of 365 nm to 420 nm and an irradiation energy of not more than 500 mJ/cm².

DESCRIPTION OF EXEMPLARY EMBODIMENTS

The present invention will be described below with respect a first embodiment. The present invention is not limited to the following embodiment, and can be modified and implemented within the range of the gist of the invention.

In the specification, the term "package substrate" means a protective substrate which seals a semiconductor chip. A "semiconductor substrate" is a semiconductor chip and has a meaning which includes a wafer as a direct substrate. A package substrate or semiconductor substrate is also referred to as package substrate or the like. The term "recorded matter" means that an ink composition is recorded on a package substrate or semiconductor substrate to form a cured material. The cured material of the specification means a cured material including a cured film or coated film.

In the specification, the term "curability" refers to a property of reacting to and being cured by light. The term "adhesiveness" means a property where a coating film undergoes little peeling, in particular a property when a vertical lattice pattern is inserted into a cured material in Examples, and penetrates into a substrate of a package substrate or the like. The term "scratch resistance" means a property where cured material undergoes little removal from the package substrate or the like during scratching of cured material. The term "alcohol resistance" refers to a property the cured material undergoes little removal from the package substrate or the like during scratching of the cured material after a recorded matter is immersed into an isopropyl alcohol solution.

In the specification, "(meth)acrylate" means at least one of acrylate and methacrylate corresponding to acrylate, and "(meth)acryl" means at least one of acryl and methacryl corresponding to acryl.

Radiation Curable Ink Jet Ink Composition

The embodiment of the present invention relates to a radiation curable ink jet ink composition. The ink composition contains vinyl ether group-containing (meth)acrylic acid esters (hereinafter, referred to as monomer A), which is represented by the following formula (I), and N-vinylcaprolactam, in predetermined amounts respectively:

$$CH_2=CR^1-COOR^2-O-CH=CH-R^3 \qquad (I)$$

In the formula, $R^1$ is a hydrogen atom or a methyl group, $R^2$ is a divalent organic residue having 2 to 20 carbon atoms, and $R^3$ is a hydrogen atom or monovalent organic residue having 1 to 11 carbon atoms.

An additive (component) which is contained or which can be contained in the ink composition of the embodiment will be described below.

Polymerizable Compound

A polymerizable compound contained in the ink composition of the embodiment can be polymerized during light irradiation by an effect of the photopolymerization initiator described below, and thus an ink composition is printed and cured.

Monomer A

In the embodiment, the monomer A, which is an essential polymerizable compound, is a compound which has a vinyl group and a (meth)acryl group in the molecule, which is represented by formula (I).

The ink composition contains monomer A, and therefore ink curability or the like can be made satisfactory.

In formula (I), a divalent organic residue represented by $R^2$ is preferably a linear, branched or cyclic alkylene group having 2 to 20 carbon atoms, an alkylene group having 2 to 20 carbon atoms, which has an oxygen atom by at least any of an ether bond and an ester bond in a structure, and a divalent aromatic group which may substituted with 6 to 11 carbon atoms. Of these, an alkylene group having 2 to 6 carbon atoms such as an ethylene group, an n-propylene group, an isopropylene group, and a butylene group; an alkylene group having 2 to 9 carbon atoms, which has an oxygen atom by an ether bond in a structure such as an oxyethylene group, an oxy-n-propylene group, an oxyisopropylene group, and an oxybutylene group are preferably used.

In formula (I), a monovalent organic group having 1 to 11 carbon atoms represented by $R^3$ is preferably a linear, branched or cyclic alkyl group having 1 to 10 carbon atoms, or an aromatic group which may be substituted with 6 to 11 carbon atoms. Of these, an alkyl group having 1 to 2 carbon atoms such as a methyl group or an ethyl group, or an aromatic group having 6 to 8 carbon atoms such as a phenyl group and a benzyl group are preferably used.

In a case where the organic residue may be substituted, the substituent is divided into a group having a carbon atom and a group having no carbon atom. First, when the substituent is a group having a carbon atom, the number of the carbon atoms which are present in an organic residue is counted. The group containing the carbon atom is not limited to the following, but for example includes a carboxyl group, and an alkoxy group. The group having no carbon atom is not limited to the following, but for example includes a hydroxyl group or a halo group.

Specific examples of monomer A represented by formula (I) is not limited to the following, but includes 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethylpropyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethyl cyclohexylmethyl(meth)acrylate, 3-vinyloxymethyl cyclohexylmethyl(meth)acrylate, 2-vinyloxymethyl cyclohexylmethyl(meth)acrylate, p-vinyloxymethyl phenylmethyl(meth)acrylate, m-vinyloxymethyl phenylmethyl(meth)acrylate, o-vinyloxymethyl phenylmethyl(meth)acrylate, 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isopropenoxyethoxyethoxy)ethyl(meth)acrylate, 2-(isopropenoxyethoxyethoxyethoxy)ethyl(meth)acrylate, 2-(isopropenoxyethoxyethoxyethoxyethoxy)ethyl(meth)acrylate, polyethyleneglycol monovinyl ether(meth)acrylate, and polypropyleneglycol monovinyl ether(meth)acrylate.

Among these, 2-vinyloxyethyl(meth)acrylate; 3-vinyloxypropyl(meth)acrylate; 1-methyl-2-vinyloxyethyl(meth)acrylate, 2-vinyloxypropyl(meth)acrylate; 4-vinyloxybutyl(meth)acrylate; 4-vinyloxycyclohexyl(meth)acrylate; 5-vinyloxypentyl(meth)acrylate; 6-vinyloxyhexyl(meth)acrylate; 4-vinyloxymethylcyclohexylmethyl(meth)acrylate; p-vinyloxymethylphenylmethyl(meth)acrylate; 2-(vinyloxyethoxy)ethyl(meth)acrylate; 2-(vinyloxyethoxyethoxy)ethyl(meth)acrylate or 2-(vinyloxyethoxyethoxyethoxy)ethyl(meth)acrylate is preferred.

Of these, 2-(vinyloxyethoxy)ethyl(meth)acrylate is preferable low viscosity, high ignition point and excellent curability, and further 2-(vinyloxyethoxy)ethyl acrylate is more preferable because of less odor, low stimulation on skin, and excellent reactivity and adhesiveness.

Examples of 2-(vinyloxyethoxy)ethyl(meth)acrylate include 2-(2-vinyloxyethoxy)ethyl(meth)acrylate and 2-(1-vinyloxyethoxy)ethyl(meth)acrylate. Examples of 2-(vinyloxyethoxy)ethyl acrylate include 2-(2-vinyloxyethoxy)ethyl acrylate and 2-(1-vinyloxyethoxy)ethyl acrylate.

The content of monomer A is 20 to 50% by mass, preferably 22 to 40% by mass, with respect to the total mass (100% by mass) of the ink composition. When the content of monomer A is within the aforementioned range, adhesiveness, scratch resistance and alcohol resistance of the ink can be made satisfactory.

The method for the production of the monomer A represented by formula (I) is not limited to the following, and includes a method which comprises esterifying (meth)acrylic acid with a hydroxyl group-containing vinyl ether (Process B), a method which comprises subjecting a (meth)acrylic acid halide and a hydroxyl group-containing vinyl ether to esterification reaction (Process C), a method which comprises subjecting (meth)acrylic anhydride and a hydroxyl group-containing vinyl ether to esterification reaction (Process D), a method which comprises subjecting a (meth)acrylic ester and a hydroxyl group-containing vinyl ether to transesterification reaction (Process E), a method which comprises esterifying (meth)acrylic acid with a halogen-containing vinyl ether (Process F), a method which comprises subjecting an alkali (or alkaline earth) metal salt of (meth)acrylic acid and a halogen-containing vinyl ether to esterification reaction (Process G), a method which comprises subjecting a hydroxyl group-containing (meth)acrylic ester and vinyl carboxylate to vinyl-exchanging reaction (Process H), and a method which comprises subjecting a hydroxyl group-containing (meth)acrylic ester and alkyl vinylether to transesterification reaction (Process I).

Of these, Process E is preferable because of further exhibiting desirable effects of the present embodiment.

N-Vinylcaprolactam

In the embodiment, N-vinylcaprolactam is an essential polymerizable compound. The ink composition contains N-vinylcaprolactam in addition to the monomer A as a polymerizable compound, and thereby adhesiveness, scratch resistance and alcohol resistance of the ink can be made satisfactory.

The content of N-vinylcaprolactam is preferably 5 to 15% by mass more preferably 6 to 10% by mass, with respect to the total mass (100% by mass) of the ink composition. When the content of monomer A and the content of N-vinylcaprolactam are within the aforementioned range, adhesiveness, scratch resistance and alcoholic resistance of the ink can become excellent.

The Other Polymerizable Compounds

As the other polymerizable compounds (hereinafter, referred to as "other polymerizable compound"), conventionally known various kinds of monomers and oligomers of mono-, di-, tri- and higher polyfunctional compounds may be used. Examples of the monomer include unsaturated carboxylic acid such as (meth)acrylic acid, itaconic acid, crotonic acid, isocrotonic acid, and maleic acid, or a salt or ester thereof, urethane, amide and anhydride thereof, acrylonitrile, styrene, various unsaturated polyesters, unsaturated polyethers, unsaturated polyamides, and unsaturated urethanes. Examples of the oligomer include an oligomer formed from the aforementioned monomer such as linear acrylic oligomer, epoxy(meth)acrylate, oxetane(meth)acrylate, aliphatic urethane (meth)acrylate, aromatic urethane(meth)acrylate and polyester(meth)acrylate.

Other monofunctional or polyfunctional monomers may include an N-vinyl compound other than N-vinyl caprolactam. Examples of the N-vinyl compound include N-vinyl formamide, N-vinyl carbazole, N-vinyl acetamide, N-vinyl pyrrolidone, and acryloylmorpholine, and derivatives thereof.

Of other polymerizable compounds, (meth)acrylic acid ester, that is to say (meth)acrylate is preferable, polyfunctional (meth)acrylate which is difunctional or more is more preferable, and polyfunctional acrylate is still more preferable. In particular, the ink composition of the embodiment contains polyfunctional acrylate in addition to N-vinylcaprolactam and the monomer in the predetermined amounts as the polymerizable compound, and thereby adhesiveness, scratch resistance and alcohol resistance of the ink become excellent.

Examples of monofunctional (meth)acrylate of the (meth) acrylate, include isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyl-diglycol(meth)acrylate, 2-hydroxybutyl(meth)acrylate, butoxyethyl(meth)acrylate, ethoxydiethyleneglycol(meth)acrylate, methoxydiethyleneglycol(meth)acrylate, methoxypolyethyleneglycol(meth)acrylate, methoxypropyleneglycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone modified flexible (meth)acrylate, t-butylcyclohexyl(meth)acrylate, dicyclopentanyl(meth)acrylate, and dicyclopentenyloxyethyl(meth)acrylate.

Examples of polyfunctional (meth)acrylate of the (meth) acrylate include difunctional (meth)acrylate such as triethyleneglycol di(meth)acrylate, tetraethyleneglycol di(meth)acrylate, polyethyleneglycol di(meth)acrylate, tripropyleneglycol di(meth)acrylate, polypropyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, dimethylol tricyclodecane di(meth)acrylate, bisphenol A of di(meth)acrylate, hydroxypivalic acid neopentylglycol di(meth)acrylate, and polytetramethyleneglycol di(meth)acrylate; tri-function (meth) acrylate such as (meth)acrylate with pentaerythritol skeleton such as trimethylolpropane tri(meth)acrylate, glycerinepropoxy tri(meth)acrylate, caprolactone modified trimethylolpropane tri(meth)acrylate, ditrimethylolpropane tetra(meth)acrylate, sorbitol penta(meth)acrylate, pentaerythritol tri (meth)acrylate, pentaerythritol tetra(meth)acrylate, and pentaerythritolethoxy tetra(meth)acrylate; (meth)acrylate with dipentaerythritol skeleton such as dipentaerythritol hexa(meth)acrylate, caprolactam modified dipentaerythritol hexa(meth)acrylate, dipentaerythritol penta(meth)acrylate, and caprolactone modified dipentaerythritol hexa(meth)acrylate, (meth)acrylate with tripentaerythritol skeleton such as propionic modified tripentaerythritol penta(meth)acrylate, tripentaerythritol hexa(meth)acrylate, tripentaerythritol hepta(meth)acrylate, and tripentaerythritol octa(meth)acrylate, (meth)acrylate with tetrapentaerythritol skeleton such as tetrapentaerythritol penta(meth)acrylate, tetrapentaerythritol hexa(meth)acrylate, tetrapentaerythritolhepta(meth)acrylate, tetrapentaerythritol octa(meth)acrylate, tetrapentaerythritol nona(meth)acrylate, and tetrapentaerythritol deca(meth) acrylate, (meth)acrylate with pentapentaerythritol skeleton such as pentapentaerythritol undeca(meth)acrylate and pentapentaerythritol dodeca(meth)acrylate; and at least one of ethyleneoxide (EO) adduct and propyleneoxide (PO) adduct of thereof.

Of these, other polymerizable compounds preferably contain polyfunctional (meth)acrylate as described above. Of polyfunctional (meth)acrylate, polyfunctional (meth)acrylate having the pentaerythritol skeleton is preferable, at least one of pentaerythritol tri(meth)acrylate and pentaerythritol tetra(meth)acrylate is more preferable. At least one of pentaerythritol triacrylate and pentaerythritol tetraacrylate is even more preferable. In this case, ink viscosity is reduced and crosslink density of the ink is increased.

Of monofunctional (meth)acrylates, at least one of phenoxyethyl(meth)acrylate and isobornyl(meth)acrylate is preferable, phenoxyethyl(meth)acrylate is more preferable, and phenoxyethylacrylate is even more preferable, because of a reduction of viscosity and odor.

The other polymerizable compound may be used independently or in a combination of two or more kinds.

The other polymerzable compounds may contain 5 to 50% by mass with respect to the total mass of the ink composition. Of these, the content of the polyfunctional acrylate is preferably 5 to 20% by mass, more preferably 8 to 15% by mass with respect to the total mass (100% by mass) of the ink composition because of excellent adhesiveness, scratch resistance, and alcohol resistance of the ink.

Polymerization Inhibitor

An ink composition of the embodiment may contain a polymerization inhibitor. Examples of the polymerization inhibitor are not limited to the following, and for example include a phenol compound such as p-methoxyphenol, cresol, t-butylcatechol, di-t-butylparacresol, hydroquinonemonomethyl ether, α-naphthol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol); a quinone compound such as p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-dibutylhydroquinone, mono-t-butylhydroquinone, monomethyl hydroquinone, and 2,5-di-t-amyl hydroquinone; an amine compound such as phenyl-β-naphthylamine, p-benzylaminophenol, di-β-naphthylparaphenylenediamine, dibenzylhydroxylamine, phenylhydroxylamine, and diethylhydroxylamine; a nitro compound such as dinitrobenzene, trinitrotoluene, and picric acid; an oxime compound such as quinonedioxime and cyclohexanoneoxime; a sulfur compound such as phenothiazine.

Photopolymerization Initiator

The ink composition of the embodiment preferably contains a photopolymerization initiator. The photopolymerization initiator is used as the aforementioned polymerizable compound, and thereby addition of a photopolymerization initiator can be omitted. However, when the photopolymerization initiator is added, initiation of polymerization can be readily adjusted, which is preferable.

The photopolymerization initiator is used where the ink composition is subjected to photopolymerization by irradiation with radiation rays, and therefore the ink composition on the surface of a recording medium is cured to form an image. Examples of the radiation rays include γ-rays, β-rays, an electron beam, ultraviolet light (UV), visible light and infrared light. Of these, ultraviolet light is preferable because it has excellent stability, and can suppress the expense of the light source. The photopolymerization initiator is not specifically limited as long as light energy results in the generation of active species such as radical or cation and initiates polymerization of the polymerizable compound, but a photo-radical or photo-cation polymerization initiator can be used. Of these, a photo-radical polymerization initiator is preferable.

Examples of the photo-radical polymerization initiators include an aromatic ketone compound, an acylphosphine oxide compound, an aromatic onium salt compound, an organic peroxide, a thio compound (thioxantone compound, organic compound having a thiophenyl group, or the like), a hexaarylbiimidazole compound, a ketoxime ester compound, a borate compound, an azinium compound, a metallocene compound, an active ester compound, a compound having a carbon-halogen bond and an alkylamine compound.

Of these, in particular, at least one of acylphosphine compound and thioxantone compound is preferable, and acylphosphine oxide compound and thioxanthone compound are more preferable, because they make the curability of ink good.

Specific examples of the photo-radical polymerization initiator include acetophenone, acetophenonebenzylketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diamino-benzophenone, Michler's ketone, benzoin isopropyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, bis-(2,4,6-trimethylbenzoyl)-phenylphosphine oxide, 2,4,6-trimethylbenzoyl-diphenyl-phosphineoxide, 2,4-diethylthioxantone, and bis-(2,6-dimethoxybenzoyl)-2,4,4-trimethylpentyl phosphineoxide.

Examples of a commercially available photo-radical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethyl benzoyl-diphenyl-phosphineoxide), IRGACURE 819 (bis(2, 4,6-trimethyl benzoyl)-phenylphosphineoxide), IRGACURE 784 (bis(η5-2,4-cyclopentadien-1-yl)-bis(2,6-difluoro-3-(1H-pyrrole-1-yl)-phenyl)titanium), IRGACURE OXE 01 (1.2-octanedion, 1-[4-(phenylthio)-, 2-(O-benzoyloxime)]), IRGACURE OXE 02 (ethanone, 1-[9-ethyl-6-(2-methylbenzoyl)-9H-carbazole-3-yl]-, 1-(O-acetyloxime)), IRGACURE 754 (mixture of oxyphenyl acetate, 2-[2-oxo-2-phenylacetoxyethoxy]ethylester and oxyphenyl acetate, 2-(2-hydroxyethoxy)ethylester) (manufactured by BASF), Speedcure TPO (manufactured by Lambson), KAYACURE DETX-S(2,4-diethylthioxantone) (manufactured by Nippon Kayaku Co., Ltd.), Lucirin TPO, LR8893, LR8970 (manufactured by BASF), and Ubecryl P36 (manufactured by UCB).

The photopolymerization inhibitor may be used independently or in a combination of two or more kinds.

The photopolymerization initiator is preferably in a range of 5 to 20% by mass with respect to the total mass (100% by mass) of the ink composition, because radiation curing rate is sufficiently exhibited and solvent residue of the polymerization initiator or coloration originated from the photopolymerization initiator is avoided.

In particular, as described above, when a photopolymerization initiator in the ink composition is an acylphosphineoxide compound and a thioxantone compound, the content of the acylphosphineoxide compound is 7.0% by mass or more, more preferably 7.0 to 15.0% by mass, with respect to the total mass (100% by mass) of the ink composition. In addition, the content of the thioxantone compound is preferably 0.3% by mass or more, more preferably 0.5 to 4.0% by mass, with respect to the total mass (100% by mass) of the ink composition. In this case, curability of the ink can become very good.

Color Material

The ink composition of the embodiment preferably further contains a color material. The color material can use at least one of a pigment and a dye.

Pigment

In the embodiment, a pigment is used as color materials, and thereby a light resistance of the ink composition can be made satisfactory. The pigment can use all of inorganic and organic pigments.

Examples of the inorganic pigment which can be used include carbon blacks (C.I. pigment black 7) such as furnace black, lamp black, acetylene black, channel black, iron oxide, or titanium oxide.

Examples of the organic pigment include an azo pigment such as an insoluble azo pigment, a condensed azo pigment, azo lake, a chelate azo pigment; a polycyclic pigment such as a phthalocyanine pigment, a perylene and a perinone pigment, an anthraquinone pigment, quinacridone pigment, a dioxane pigment, a thioindigo pigment, an isoindolinone pigment, a quinophthalone pigment; a dye chelate (for example, basic dye type chelate, acidic dye type chelate, or the like), a dye lake (basic dye type lake, acid dye lake), a nitro pigment, a nitroso pigment, an aniline black, and daylight fluorescent pigment.

More specifically, examples of the carbon black used as a black ink include No. 2300, No. 900, MCF88, No. 33, No. 40, No. 45, No. 52, MA7, MA8, MA100, No. 2200B or the like (all manufactured by Mitsubishi Chemical Corporation), Raven 5750, Raven 5250, Raven 5000, Raven 3500, Raven 1255, Raven 700, or the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, or the like (manufactured by CABOT JAPAN K.K.), Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, Special Black 4 (all manufactured by Degussa).

Examples of pigment used as white ink include C.I. pigment white 6, 18, 21.

Examples of pigments used as the yellow ink include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180.

Examples of pigments used as the magenta ink include 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. pigment violet 19, 23, 32, 33, 36, 38, 43, 50.

Examples of pigments used as the cyan ink include C.I. pigment blue 1, 2, 3, 15, 15:1, 15:2, 15:3, 15:34, 15:4, 16, 18, 22, 25, 60, 65, 66, C.I. vat blue 4, 60.

Examples of pigments used other than the magenta, cyan, and yellow ink include C.I. pigment green 7, 10, C.I. pigment brown 3, 5, 25, 26, C.I. pigment orange 1, 2, 5, 7, 13, 14, 15, 16, 24, 34, 36, 38, 40, 43, 63.

The pigment may be used independently, or in a combination of two or more kinds.

When the pigment is used, an average particle size thereof is preferably 300 nm or lower, and more preferably 50 to 250 nm. When the average particle size is in the aforementioned range, reliability such as an ejection stability or dispersion stability of the ink composition becomes further excellent, and therefore an image having excellent image quality can be formed. In the specification, the average particle size is measured by a dynamic light scattering method.

Dye

In the embodiment, dyes can be used as color material. The dyes are not specifically limited below, and acidic dyes, direct dyes, reactive dyes, and basic dyes can be used. Examples of the dyes include C.I. Acid yellow 17, 23, 42, 44, 79, 142, C.I. acid red 52, 80, 82, 249, 254, 289, C.I. acid blue 9, 45, 249, C.I. acid black 1, 2, 24, 94, C.I. hood black 1, 2, C.I. direct yellow 1, 12, 24, 33, 50, 55, 58, 86, 132, 142, 144, 173, C.I. direct red 1, 4, 9, 80, 81, 225, 227, C.I. direct blue 1, 2, 15, 71, 86, 87, 98, 165, 199, 202, C.I. direct black 19, 38, 51, 71, 154, 168, 171, 195, C.I. reactive red 14, 32, 55, 79, 249, C.I. reactive black 3, 4, 35.

The dye may be used independently or in a combination of two or more kinds.

The content of the color materials is preferably in the range of 1 to 20% by mass with respect to the total mass (100% by mass) of the ink composition, because excellent shielding and color reproducibility are obtained.

Dispersing Agent

When the ink composition of the embodiment contains pigment, pigment dispersibility improves and therefore may further contain a dispersing agent. The dispersing agent is not specifically limited and examples may include dispersing agents which are generally used for producing a pigment dispersion such as a polymer dispersing agent. Specific examples of the dispersing agent include, as the main component, at least one of polyoxyalkylene polyalkylenepolyamine, a vinyl-based polymer and copolymer, an acryl-based polymer and copolymer, polyester, polyamide, polyimide, polyurethane, an amino-based polymer, a silicon-containing polymer, a sulfur-containing polymer, a fluorine-containing polymer, and an epoxy resin. Examples of a commercially available polymer dispersing agent include, Aji Super Series manufactured by Ajinomoto Fine-Techno Co., Inc., Solsperse series (Solsperse 36000) manufactured by Avecia Co., Disperbyk series manufactured by BYK, and Dispersion series manufactured by KUSUMOTO Chemicals, Ltd.

Slipping Agent

Since the ink composition of the embodiment has excellent scratch resistance, it may further contain a slipping agent (surfactant). The slipping agent is not specifically limited below, but for example includes polyester modified silicone or polyether modified silicone as a silicone-based surfactant. The polyether modified polydimethyl siloxane or polyester modified polydimethyl siloxane is preferably used. Specifically, BYK-347, BYK-348, BYK-UV3500, 3510, 3530, 3570 (all manufactured by BYK) may be included.

Other Additives

The ink composition of the embodiment may contain additives (components) other than the aforementioned additive. The component is not specifically limited below, and for example includes a polymerization enhancer, a penetration enhancer, and a wetting agent (humectant) of the related art, and other additives. The other additives include a fixing agent, an anti-mold agent, a preservative agent, an antioxidant, a radiation-ray absorbent, a chelating agent, pH modulator, and a thickening agent, which has been known.

Recording Medium

The radiation curable ink jet ink composition of the embodiment use the following ink jet recording method, and is ejected to a recording medium, to obtain a recorded matter. The recording medium is preferably a package substrate or semiconductor substrate. The reason is that an ink used should have excellent adhesiveness, scratch resistance, and alcohol resistance when marking is performed in a package substrate or the like.

As defined above, a package substrate means a protective substrate sealing a semiconductor chip or the like. The semi-conductor substrate is a semiconductor chip and has a meaning which includes a wafer as a direct substrate. The semi-conductor chip or the like is sealed and produced to form an electronic component (IC package). One or more of the electronic components is integrated to form an electronic apparatus.

Examples of standard of package substrate include insertion-type package such as PGA (Pin Grid Array), DIP (Dual Inline Package), SIP (Single Inline Package), ZIP (Zigzag Inline Package), DO (Diode Outline) package, and TO (Transistor Outline) package; and surface mounting type package such as P-BGA (Plastic Ball grid array), T-BGA (Tape Ball grid array), F-BGA (Fine Pitch Ball grid array), SOJ (Small Outline J-leaded), TSOP (Thin Small Outline Package), SON (Small Outline Non-lead), QFP (Quad Flat Package), CFP (Ceramic Flat Package), SOT (Small Outline Transistor), PLCC (Plastic leaded chip carrier), LGA (Land grid array), LLCC (Leadless chip carrier), TCP (Tape carrier package), LLP (Leadless Leadframe Package), and DFN (Dual Flat-pack Non-lead).

Examples of a commercially available package substrate include a general logic IC package (SOP14-P-300-1.27A) manufactured by Toshiba Semi-Conductor Co., Ltd., surface mounting package (UPA2350B1G) manufactured by Renesas Electronics Corporation, surface mounting package (P-LFBGA048-0606) manufactured by Sharp Corporation and serial EEPROM (BR24L01A) manufactured by ROHM Co., Ltd.

Examples of materials of the package substrate include nonabsorbent material in order to prevent infiltration of ink to the main body of electronic component. Specific examples of the nonabsorbent material are not limited to the following, but include metals such as gold, silver, copper, aluminum, iron-nickel alloy, stainless, and brass; inorganic material such as semiconductor (for example, silicon), carbide, nitride (for example, silicon nitride), and boride, and organic material such as silicone, epoxy resin, phenol resin, polyimide, and polymethyl methacrylate (PMMA).

Of these, silicone or epoxy resin is more preferable as the package substrate or the like in order to have good adhesiveness with ink. Thus, package substrate formed of silicone or epoxy resin is used as sealing materials of electronic components, and therefore the ink composition of the embodiment can be preferably recorded (marking) on the outer face of package substrate.

On the other hand, examples of commercially available semiconductor substrate (wafer) include 300 mm silicon wafer manufactured by Shin-Etsu Chemical Co., Ltd., SOI wafer manufactured by SUMCO, and polished wafer manufactured by Covalent Materials Corporation.

Examples of materials of the semiconductor substrate include silicon, germanium and selenium. Of these, silicon is preferable since it has excellent adhesiveness with ink and is very stable as semiconductor material.

Examples of the electronic apparatus include a USB memory, a memory card, an SD memory card, a memory stick, a smart media, an xD picture card, and a flash memory card such as compact flash (registered trademark).

A method for marking on package substrates will be described.

When marking is performed on a wafer as a semiconductor substrate, marking may be performed on a wafer before dicing, or marking may be performed on a semiconductor chip which is diced into a chip shape after forming circuits on a wafer. In the latter case, a silicon wafer where an IC (integrated circuit) is formed generally forms a silicon oxide film on the surface of wafer during circuit formation. Examples of the method for forming a silicon oxide film include a high frequency sputtering method which has excellent control of thickness. The method can be used to sputter, on the silicon wafer, silicon dioxide which is a target material.

In a case of performing a marking on a package substrate, the marking may be performed on a package substrate after sealing of semiconductor chip, or marking may be performed on a package substrate before sealing of semiconductor chip.

The electronic components are produced by bonding a pad of a semiconductor chip and a lead frame and sealing the whole chip together with a sealing agent in a package substrate. The sealing agent is not limited to the following, but for example includes an epoxy resin, a phenol resin and a silicone resin. Marking can be performed on the surface (outer surface) of the electronic components thus produced. When the ink composition is applied to a nonabsorbent recording medium, a drying process after irradiation and curing with ultraviolet rays should be provided.

Thus, according to the embodiment, a radiation curable ink jet ink composition which has excellent adhesiveness, scratch resistance, and alcohol resistance can be provided. According to the present embodiment, a radiation curable ink jet ink composition having excellent adhesiveness to pretreated package substrate or the like, and excellent scratch resistance and flux cleaning (IPA) capacity can be provided.

Recorded Matter

The embodiment of the invention relates to a recorded matter. The recorded matter is to record the ink composition of the embodiment to a package substrate or the like as a recording medium, which contains the package substrate or the like and a cured material with the ink composition which is recorded on the package substrate or the like. The recorded matter has excellent adhesiveness of the ink composition (cured material) which is attached to a package substrate to the package substrate or the like, in which the cured ink composition has excellent scratch resistance and alcohol resistance.

Ink Jet Recording Method

The embodiment of the present invention relates to an ink jet recording method. The ink jet recording method includes processes of ejecting the ink composition of the embodiment on a package substrate or the like (recording medium), and of curing the ink composition which is irradiated with an active radiation having an emission peak wavelength in the predetermined range. Thus, a cured film (coating film) is formed by the ink composition cured on the package substrate or the like. The processes will be described in detail below.

Ejecting Process

The ejecting process can use the ink jet recording apparatus of the related art. When the ink composition is ejected, the viscosity is preferably 30 mPa·s or less, more preferably 5 to 20 mPa·s. The ink composition may be ejected at room temperature or in an unheated state as long as the viscosity thereof is adjusted such that the temperature of the composition is at room temperature or in an unheated state. On the other hand, the ink composition may be ejected as long as a viscosity is in the desirable range by heating the composition to the predetermined temperature. Thus, a good ejection stability can be obtained.

Curing Process

Then, in the curing process, the ink composition which is ejected to the package substrate or the like is cured by irradiation with radiation (light).

Specifically, the polymerization reaction of the polymerizable compound starts due to irradiation with radiation. Moreover, the ink composition contains a photopolymerization initiator, which is decomposed by irradiation with radiation to generate initiation species such as radicals, acids and bases, and then the initiation species promote a polymerization reaction of the polymerizable compound, depending on the function of the initiation species. In this case, when the ink composition contains a photopolymerization initiator and a sensitizing dye, the sensitizing dye reaches an excitation state by absorption of activation radiation, and contact with the photopolymerization initiator promotes decomposition thereof, curing reaction can be achieved with greater sensitivity.

Examples of radiation-ray source which is mainly used include mercury lamp or gas and solid laser. Examples of light source used in the curing of radiation curable ink jet ink composition include a mercury lamp, or a metal halide lamp, which is widely used. On the other hand, from the viewpoint of current environmental conservation, one free of mercury is strongly demanded, and substitution with a GaN-based semiconductor ultraviolet emitting device is industrially and environmentally very useful. Ultraviolet emitting diodes (UV-LED) and ultraviolet laser diodes (UV-LD) have a small size, high longevity, high efficiency, and low expense, which are expected as a radiation curable ink jet light source. Of these, UV-LEDs are preferable.

An ink composition where a radiation-ray is irradiated and cured such that an emission peak wavelength is preferably in the range of 350 to 400 nm, more preferably in the range of 365 to 395 nm is used. The irradiation energy is preferably 800 mJ/cm$^2$ or less, and more preferably 200 to 700 mJ/cm$^2$.

In this case, the composition of the ink composition of the embodiment can result in curing at a low energy and a high rate. The irradiation energy is calculated by multiplying the irradiation intensity by the irradiation time. When the irradiation time can be shortened due to the composition of the ink composition of the embodiment, the recording rate can increase. On the other hand, when the irradiation intensity can be decreased due to the composition of the ink composition of the embodiment, a decrease in apparatus size or lower costs can be realized. For irradiation with radiation rays in this case, a UV-LED is preferably used. Such an ink composition contains a photopolymerization initiator decomposed by irradiation with radiation in the wavelength range, and a polymerizable compound initiating polymerization with irradiation by radiation of the wavelength range. The emission peak wavelength may be have one or plural values in the wavelength range. Even when plural kinds of wavelength are used, the overall irradiation energy of radiation having the emission peak wavelength is the aforementioned irradiation energy.

According to the present embodiment, a recorded matter which uses the radiation curable ink jet ink composition having excellent scratch resistance, adhesiveness and alcohol resistance, and an ink jet recording method can be provided.

The present invention will be described in detail below with respect to a second embodiment. The present invention is not limited to the following embodiment, and can be modified and implemented within the range of the gist of the invention.

In the specification, the term "package substrate" means a protective substrate which seals a semiconductor chip. A "semiconductor substrate" is a semiconductor chip and has a meaning which includes a wafer as a direct substrate. A package substrate or semiconductor substrate is referred to as package substrate or the like. A "recorded matter" means that ink is recorded on a package substrate or semiconductor substrate to form a cured material. The cured material of the specification means a cured material including a cured film or coating film.

In the specification, term "curability" means a property of reacting to and being cured by light. The term "scratch resistance" means a property hardly removing a cured material from the package substrate or the like during scratch of the cured material. The term "visibility" is the property of an image (including characters) being recognizable to the human eye. The term "preservation stability" is a property where viscosity undergoes little change before and after preservation.

In the specification, "(meth)acrylate" means at least one of acrylate and methacrylate corresponding to acrylate. "(meth)acryl" means at least one of acryl and methacryl corresponding to acryl.

Ultraviolet Curable Ink Jet Ink Composition

An embodiment of the present invention relates to an ultraviolet curable ink jet ink composition. The ink composition contains a polymerizable compound, a photopolymerization initiator, and a titanium oxide. The median size of the titanium oxide by a dynamic light scattering method is 260 nm or lower, and the content of the titanium oxide is 12 to 18% by mass, with respect to the total mass. The ink composition is characterized by being suitable for recording onto a package substrate or a semiconductor substrate as a recording medium.

An additive (component) which is contained or which can be contained in the ink composition of the embodiment will be described.

Polymerizable Compound

The ink composition of the embodiment contains a polymerizable compound. The polymerizable compound can be polymerized during optical irradiation by an effect of the following photopolymerization initiator, and thus an ink composition is printed and cured.

N-Vinyl Caprolactam

The polymerizable compound of the embodiment preferably contains N-vinyl caprolactam. The ink composition contains N-vinyl caprolactam as the polymerizable compound, and thereby curability of the ink, scratch resistance of the cured ink and visibility of the recorded image can be made satisfactory.

The content of N-vinylcaprolactam is preferably 5 to 25% by mass, more preferably 8 to 20% by mass, with respect to the total mass (100% by mass) of the ink composition. When the content of N-vinylcaprolactam is within the aforementioned range, curability of the ink, scratch resistance of the cured ink and visibility of the recorded image can be excellent and preservation stability of the ink is excellent becomes good.

Compound Having Vinyl Group and (Meth)Acryl Group in Molecule

The ink composition of the embodiment may include a compound (referred to as "monomer A") represented by formula (I).

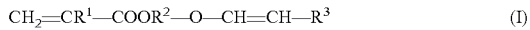

$$CH_2=CR^1-COOR^2-O-CH=CH-R^3 \quad (I)$$

In the formula, $R^1$ is a hydrogen atom or a methyl group, $R^2$ is a divalent organic residue having 2 to 20 carbon atoms, and $R^3$ is a hydrogen atom or monovalent organic residue having 1 to 11 carbon atoms.

The monomer A is a compound which has a vinyl group and (meth)acryl group in the molecule, that is to say (meth)acrylic ester containing a vinyl ether group.

The ink composition contains monomer A, and therefore ink curability can be made satisfactory.

In formula (I), a divalent organic residue represented by $R^2$ is preferably a linear, branched or cyclic alkylene group having 2 to 20 carbon atoms, an alkylene group having 2 to 20 carbon atoms, which has an oxygen atom by at least of an ether bond and an ester bond in a structure, and a divalent aromatic group which may substituted with 6 to 11 carbon atoms. Of these, an alkylene group having 2 to 6 carbon atoms such as an ethylene group, an n-propylene group, an isopropylene group, and a butylene group; an alkylene group having 2 to 9 carbon atoms, which has oxygen atom by an ether bond in a structure such as an oxyethylene group, an oxy-n-propylene group, an oxyisopropylene group, and an oxybutylene group are preferably used.

In formula (I), a monovalent organic residue having 1 to 11 carbon atoms represented by $R^3$ is preferably a linear, branched or cyclic alkyl group having 1 to 10 carbon atoms, or an aromatic group which may be substituted with 6 to 11 carbon atoms. Of these, an alkyl group having 1 to 2 carbon atoms such as a methyl group, or an ethyl group, or an aromatic group having 6 to 8 carbon atoms such as a phenyl group and benzyl group are preferably used.

In a case where the organic residue may be substituted, the substituent is divided into a group having a carbon atom and a group having no carbon atom. First, when the substituent is a group having a carbon atom, the number of the carbon atoms which are present in an organic residue is counted. The group containing the carbon atom is not limited to the following, but for example includes a carboxyl group, an alkoxy group. The group having no carbon atom is not limited to the following, but for example includes a hydroxyl group or a halo group.

Specific examples of monomer A represented by formula (I) is not limited to the following, but includes monofunctional hydroxyl group-containing (meth)acrylates, such as 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-2-vinyloxyethyl(meth)acrylate, 1-vinyloxymethylpropyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethyl cyclohexylmethyl(meth)acrylate, 3-vinyloxymethyl cyclohexylmethyl(meth)acrylate, 2-vinyloxymethyl cyclohexylmethyl(meth)acrylate, p-vinyloxymethyl phenylmethyl(meth)acrylate, m-vinyloxymethyl phenylmethyl(meth)acrylate, o-vinyloxymethyl phenylmethyl(meth)acrylate, 2-(vinyloxyethoxy)ethyl (meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy) propyl(meth)acrylate, 2-(vinyloxyisopropoxy)isopropyl (meth)acrylate, 2-(vinyloxyethoxyethoxy)ethyl(meth) acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxy)ethyl(meth)acrylate, 2-(isopropenoxyethoxy)ethyl(meth)acrylate, 2-(isopropenoxyethoxyethoxy)ethyl(meth)acrylate, 2-(isopropenoxyethoxyethoxy)ethyl(meth)acrylate, 2-(isopropenoxyethoxyethoxyethoxy)ethyl(meth)acrylate, polyethyleneglycolmonovinyl ether(meth)acrylate, and polypropyleneglycolmonovinyl ether(meth)acrylate.

Among these, 2-vinyloxyethyl(meth)acrylate; 3-vinyloxypropyl(meth)acrylate; 1-methyl-2-vinyloxyethyl(meth) acrylate, 2-vinyloxypropyl(meth)acrylate; 4-vinyloxybutyl (meth)acrylate; 4-vinyloxycyclohexyl(meth)acrylate; 5-vinyloxypentyl(meth)acrylate; 6-vinyloxyhexyl(meth) acrylate; 4-vinyloxymethylcyclohexylmethyl(meth)acrylate; p-vinyloxymethylphenylmethyl(meth)acrylate; 2-(vinyloxyethoxy)ethyl(meth)acrylate; 2-(vinyloxyethoxyethoxy)ethyl (meth)acrylate and 2-(vinyloxyethoxyethoxyethoxy)ethyl (meth)acrylate are preferred.

Of these, 2-(vinyloxyethoxy)ethyl(meth)acrylate is preferable because of low viscosity, high ignition point and excellent curability. 2-(vinyloxyethoxy)ethyl acrylate is more preferable because of less odor, low stimulation on skin, and excellent reactivity and adhesiveness.

Examples of 2-(vinyloxyethoxy)ethyl(meth)acrylate include 2-(2-vinyloxyethoxy)ethyl(meth)acrylate and 2-(1-vinyloxyethoxy)ethyl(meth)acrylate. Examples of 2-(vinyloxyethoxy)ethyl acrylate include 2-(2-vinyloxyethoxy)ethyl acrylate and 2-(1-vinyloxyethoxy)ethyl acrylate.

The monomer A may be used independently or in a combination of two or more kinds.

The content of monomer A is preferably 20 to 50% by mass with respect to 100% by mass of the total mass of the ink composition. When the content of monomer A is within the aforementioned range, it can have good scratch resistance of cured ink.

The method for the production of the monomer A represented by formula (I) is not limited to the following, and includes a method which comprises esterifying (meth)acrylic acid with a hydroxyl group-containing vinyl ether (Process B), a method which comprises subjecting a (meth)acrylic acid halide and a hydroxyl group-containing vinyl ether to esterification reaction (Process C), a method which comprises subjecting (meth)acrylic anhydride and a hydroxyl group-containing vinyl ether to esterification reaction (Process D), a method which comprises subjecting a (meth)acrylic ester and a hydroxyl group-containing vinyl ether to transesterification reaction (Process E), a method which comprises esterifying (meth)acrylic acid with a halogen-containing vinyl ether (Process F), a method which comprises subjecting an alkali (or alkaline earth) metal salt of (meth)acrylic acid and a halogen-containing vinyl ether to esterification reaction (Process G), a method which comprises subjecting a hydroxyl group-containing (meth)acrylic ester and vinyl carboxylate to vinyl-exchanging reaction (Process H), and a method which comprises subjecting a hydroxyl group-containing (meth) acrylic ester and alkyl vinylether to transesterification reaction (Process I). Of these, Process E is preferable because of further exhibiting desirable effects of the present embodiment.

The Other Polymerizable Compound

As the other polymerizable compounds (hereinafter, referred to as "other polymerizable compound"), conventionally known various kinds of monomers and oligomers of mono-, di-, tri- and higher polyfunctional compounds may be used. Examples of the monomer include unsaturated carboxylic acid such as (meth)acrylic acid, itaconic acid, crotonic acid, isocrotonic acid, and maleic acid, or a salt or ester thereof, urethane, amide and anhydride thereof, acrylonitrile, styrene, a variety of unsaturated polyester, unsaturated polyether, unsaturated polyamide, and unsaturated urethane. Examples of the oligomer include an oligomer formed from the aforementioned monomer such as linear acrylic oligomer, epoxy(meth)acrylate, oxetane(meth)acrylate, aliphatic urethane(meth)acrylate, aromatic urethane(meth)acrylate and polyester(meth)acrylate.

Other monofunctional or polyfunctional monomers may contain an N-vinyl compound other than N-vinyl caprolactam. Examples of the N-vinyl compound include, N-vinyl formamide, N-vinyl carbazole, N-vinyl acetamide, N-vinyl pyrolidone, and acryloylmorpholine, and derivatives thereof.

Of other polymerizable compounds, (meth)acrylic ester, that is to say (meth)acrylate is preferable, difunctional or higher (meth)acrylate is more preferable, polyfunctional acrylate is still more preferable.

Examples of monofunctional (meth)acrylate of the (meth) acrylate, include isoamyl(meth)acrylate, stearyl(meth)acrylate, lauryl(meth)acrylate, octyl(meth)acrylate, decyl(meth) acrylate, isomyristyl(meth)acrylate, isostearyl(meth) acrylate, 2-ethylhexyl-diglycol(meth)acrylate, 2-hydroxybutyl(meth)acrylate, butoxyethyl(meth)acrylate, ethoxydiethyleneglycol(meth)acrylate, methoxydiethyleneglycol(meth)acrylate, methoxypolyethyleneglycol(meth) acrylate, methoxypropyleneglycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone modified flexible (meth)acrylate, t-butylcyclohexyl(meth)acrylate, dicyclopentanyl(meth) acrylate, and dicyclopentenyloxyethyl(meth)acrylate. Of these, at least one of phenoxyethyl(meth)acrylate and isobornyl(meth)acrylate is preferable, phenoxyethyl(meth) acrylate is more preferable, and phenoxyethylacrylate is even more preferable, because of a reduction of viscosity and odor.

Examples of polyfunctional (meth)acrylate of the (meth) acrylate include difunctional (meth)acrylate such as triethyleneglycol di(meth)acrylate, tetraethyleneglycol di(meth) acrylate, polyethyleneglycol di(meth)acrylate, tripropyleneglycol di(meth)acrylate, polypropyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, dimethylol tricyclodecane di(meth)acrylate, bisphenol A of di(meth)acrylate, hydroxypivalic acid neopentylglycol di(meth)acrylate, and polytetramethyleneglycol di(meth)acrylate; tri-function (meth) acrylate such as (meth)acrylate with dipentaerythritol skeleton such as trimethylolpropane tri(meth)acrylate, glycerinepropoxy tri(meth)acrylate, caprolactone modified trimethylolpropane tri(meth)acrylate, ditrimethylolpropane tetra(meth)acrylate, sorbitol penta(meth)acrylate, pentaerythritol tri(meth)acrylate, pentaerythritol tetra(meth)acrylate, and pentaerythritolethoxy tetra(meth)acrylate; (meth)acrylate with dipentaerythritol skeleton such as dipentaerythritol hexa(meth)acrylate, caprolactam modified dipentaerythritol hexa(meth)acrylate, dipentaerythritol penta(meth)acrylate, and caprolactone modified dipentaerythritol hexa(meth)acrylate, (meth)acrylate with tripentaerythritol skeleton such as propionic modified tripentaerythritol penta(meth)acrylate, tripentaerythritol hexa(meth)acrylate, tripentaerythritol hepta(meth)acrylate, and tripentaerythritol octa(meth)acrylate, (meth)acrylate with tetrapentaerythritol skeleton such as tetrapentaerythritol penta(meth)acrylate, tetrapentaerythritol hexa(meth)acrylate, tetrapentaerythritolhepta(meth)acrylate, tetrapentaerythritol octa(meth)acrylate, tetrapentaerythritol nona(meth)acrylate, and tetrapentaerythritol deca(meth)acrylate, (meth)acrylate with pentapentaerythritol skeleton such as pentapentaerythritol undeca(meth)acrylate and pentapentaerythritol dodeca(meth)acrylate; and at least of ethyleneoxide (EO) adduct and propyleneoxide (PO) adduct of thereof.

Of these, polyfunctional (meth)acrylate having the pentaerythritol skeleton is preferable, at least one of pentaerythritol tri(meth)acrylate and pentaerythritol tetra(meth)acrylate is more preferable. At least one of pentaerythritoltriacrylate and pentaerythritoltetraacrylate is still more preferable. Pentaerythritol triacrylate is even more preferable. In this case, scratch resistance of cured ink can be made satisfactory.

The other polymerizable compound may be used independently or in a combination of two or more kinds.

Photopolymerization Initiator

The ink composition of the embodiment contains a photopolymerization initiator. The, photopolymerization initiator is used for curing an ink by photopolymerization with ultraviolet rays on the surface of a recording medium to form an image, because it has an excellent stability, and a suppressed expense of light source. The photopolymerization initiator is not specifically limited as long as light energy results in the generation of active species such as radicals or cations and initiates polymerization of the polymerizable compound, but an optical radical or optical cation polymerization initiator can be used. Of these, a photo-radical polymerization initiator is preferable.

The ink composition of the embodiment preferably contains acryl phosphinoxide compound (hereinafter, referred to as "acylphosphineoxide-based photopolymerization initiator") as the optical radial polymerization initiator because curability can be made satisfactory. The acylphosphineoxide-based photopolymerization initiator produces an effect suitable for curing by irradiation with the following ultraviolet ray. The acylphosphineoxide-based photopolymerization initiator has a high photofragmentation in emission peak wavelength of ultraviolet rays which are irradiated during curing, in comparison of other kinds of photopolymerization initiators. Therefore, an amount of the unreacted residual photopolymerization initiator can be suppressed. Accordingly, when the acylphosphineoxide-based photopolymerization initiator is used, film properties of ink coating become excellent.

Examples of the acylphosphineoxide-based photopolymerization initiator is not limited to the following, and for example include bis(2,4,6-trimethylbenzoyl)-phenylphosphineoxide, 2,4,6-trimethylbenzoyl-diphenyl-phosphineoxide, and bis-(2,6-dimethoxybenzoyl)-2,4,4-trimethylpentyl phosphineoxide.

Examples of commercially available acylphosphineoxide-based photopolymerization initiators include DAROCUR TPO (2,4,6-trimethylbenzoyl-diphenyl-phosphineoxide), IRGACURE 819 (bis(2,4,6-trimethylbenzoyl)-phenylphosphineoxide).

The photopolymerization initiator contained in the ink composition of the embodiment is formed of acylphosphineoxide-based photopolymerization initiator, but may contain one other than the photopolymerization initiator.

Of photo-radical polymerization initiator, one other than acylphosphineoxide-compound includes aromatic ketones, aromatic onium salt compound, organic peroxide, thio compound (thioxantone compound, thiophenyl group-containing compound, or the like), hexaarylbiimidazole compound, ketooxime ester compound, borate compound, azinium compound, metallocene compound, active ester compound, carbon halogen bonded compound, and alkylamine compound.

Of these, since curability of the ink is further improved in combination of acylphosphineoxide compound, a thioxantone compound is preferable.

Specific examples of the photo-radical polymerization initiator other than the acylphosphine oxide compound include acetophenone, acetophenonebenzylketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diamino-benzophenone, Michler's ketone, benzoin isopropyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio) phenyl]-2-morpholino-propan-1-one, and 2,4-diethylthioxantone.

Examples of a commercially available photo-radical polymerization initiator other than the acylphosphine oxide compound include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl) methyl]-1-[4-(4-morpholinyl)phenyl]-1-butanone), IRGACURE 784 (bis(η5-2,4-cyclopentadien-1-yl)-bis(2,6-difluoro-3-(1H-pyrrole-1-yl)-phenyl)titanium), IRGACURE OXE 01 (1.2-octanedion, 1-[4-(phenylthio)-, 2-(O-benzoyloxime)]), IRGACURE OXE 02 (ethanone, 1-[9-ethyl-6-(2-methylbenzoyl)-9H-carbazole-3-yl]-, 1-(O-acetyloxime)), IRGACURE 754 (mixture of oxyphenyl acetate, 2-[2-oxo-2-phenylacetoxyethoxy]ethylester and oxyphenyl acetate, 2-(2-hydroxyethoxy)ethylester) (manufactured by BASF), Speedcure TPO (manufactured by Lambson), KAYACURE DETX-S(2,4-diethylthioxantone) (manufactured by Nippon Kayaku Co., Ltd.), Lucirin TPO, LR8893, LR8970 (manufactured by BASF), and Ubecryl P36 (manufactured by UCB).

The photopolymerization inhibitor may be used independently or in a combination of two or more kinds.

The content of the photopolymerization initiator is preferably 7 to 15% by mass, and more preferably 5 to 10% by mass, with respect to the total mass (100% by mass) of the ink composition. When the content is in the aforementioned range, curability (ultraviolet curing rate) of the ink, scratch resistance of the cured ink and visibility of the recorded image can become excellent and solvent residue of photopolymerization initiator or coloration resulting from photopolymerization initiator can be avoided.

Titanium Oxide

The ink composition of the embodiment contains titanium oxide as white pigment. Thereby, good visibility (brightness) is obtained.

The titanium oxide is preferably general rutyl type titanium oxide as the white pigment. The rutyl type titanium oxide may be produced directly, or a commercially available titanium oxide. Examples of an industrially producing method when the rutyl type titanium oxide (powder) is produced directly include the related sulfuric acid and hydrochloric acid processes.

Examples of the commercially available rutyl type titanium oxide include rutyl type such as Tipaque (registered trademark) CR-60-2, CR-67, R-980, R-780, R-850, R-980, R-630, R-670, PF-736 (trade names, all manufactured by ISHIHARA SANGYO KAISHA, LTD.).

The median size of titanium oxide is 260 nm or lower, preferably 200 to 260 nm, and more preferably 210 to 260 nm. When the median size is in the aforementioned range, curability of the ink and scratch resistance of the cured ink is excellent, and visibility of the recorded image can become excellent, and therefore a high quality image can be formed. In the specification "median size of titanium oxide" means not the median size of titanium oxide before preparation of the ink composition, but median size of titanium oxide which is present in the ink composition.

In the specification, median size means 50% average particle size (d50) in terms of spherical conversion (calculation) by a dynamic light scattering method, and the value is obtained as follows.

Light is irradiated into a dispersion medium, a detector is displaced in front, side, and rear of the dispersion medium, and thereby occurring diffraction scattering light is measured. The obtained measurement is used to assume originally unshaped particle as a spherical form, the total volume of particle population in terms of spherical conversion (calculation) with the same volume as that of the particle is set to 100%, and accumulative curve is obtained, a point having 50% of the accumulated value is set to "50% average particle size in terms of spherical conversion (calculation) by dynamic light scattering method" (d50).

In the specification, a measuring apparatus used in measurement of median size by the dynamic light scattering method, and a diluting solvent for measurement is used in Example described below.

The content of titanium oxide is 12 to 18% by mass, preferably 14 to 16% by mass, with respect to the total mass (100% by mass) of the ink composition because of excellent curability (in particular black substrate) and shielding and color reproducibility.

Dispersing Agent

When the ink composition of the embodiment contains pigment, pigment dispersibility improves and therefore may have further a dispersing agent. The dispersing agent is not specifically limited below, for example a dispersing agent which is generally used for producing a pigment dispersion of a polymer dispersing agent or the like. Specific examples of the dispersing agent include, as the main component, any one of polyoxyalkylenepolyalkylenepolyamine, a vinyl-based polymer and copolymer, an acryl-based polymer and copolymer, polyester, polyamide, polyimide, polyurethane, an amino-based polymer, a silicon-containing polymer, a sulfur-containing polymer, a fluorine-containing polymer, and an epoxy resin. Examples of a commercially available polymer dispersing agent include, Aji Super Series manufactured by Ajinomoto Fine-Techno Co., Inc., Solsperse series (Solsperse 36000) manufactured by Noveon, Disperbyk series manufactured by BYK, Disperlon series manufactured by KUSUMOTO Chemicals, Ltd.

Polymerization Inhibitor

An ink composition of the embodiment may contain a polymerization inhibitor in order to suppress a polymerization reaction of a polymerizable compound before curing. Examples of the polymerization inhibitor are not limited to the following, and for example include a phenol compound such as p-methoxyphenol, cresol, t-butylcatechol, di-t-butylparacresol, hydroquinonemonomethyl ether, α-naphthol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol); a quinone compound such as p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-dibutylhydroquinone, mono-t-butylhydroquinone, monomethyl hydroquinone, and 2,5-di-t-amyl hydroquinone; an amine compound such as phenyl-(β-naphthylamine, p-benzylaminophenol, di-β-naphthylparaphenylenediamine, dibenzylhydroxylamine, phenylhydroxylamine, and diethylhydroxylamine; a nitro compound such as dinitrobenzene, trinitrotoluene, and picric acid; an oxime compound such as quinonedioxime and cyclohexanoneoxime; a sulfur compound such as phenothiazine.

Surfactant

Since the ink composition of the embodiment has excellent scratch resistance of cured ink, it may contain a surfactant. The surfactant is not specifically limited below, and for example includes polyester modified silicone or polyether modified silicone as a silicone-based surfactant. The polyether modified polydimethyl siloxane or polyester modified polydimethyl siloxane is preferably used. Specifically, BYK-347, BYK-348, BYK-UV3500, 3510, 3530, 3570 (trade name, all manufactured by BYK).

Other Additives

The ink composition of the embodiment may contain additives (components) other than the aforementioned additive. The component is not specifically limited below, and for example includes a polymerization enhancer, a penetration enhancer, and a wetting agent (humectant) of the related art, and other additives. The other additives include a known fixing agent, anti-mold agent, preservative agent, antioxidant, ultraviolet absorbent, chelating agent, pH modulator, and thickening agent.

The ink composition of the embodiment can be cured by irradiation with ultraviolet rays having an emission peak wavelength preferably in a range of 365 to 420 nm, more preferably in a range of 365 to 395 nm. The ink composition which cures by irradiation with ultraviolet rays of 500 mJ/cm$^2$ or lower is preferable, and one of 800 mJ/cm$^2$ or lower is more preferable. The ink composition is used to form an image at a low cost.

Recording Medium

The ultraviolet-curable ink jet ink composition of the embodiment use the following ink jet recording method, and is ejected to a recording medium, to obtain a recorded matter. The recording medium is preferably a package substrate or semiconductor substrate. In other words, the ink composition is suitable for recording on a package substrate as a recording medium, because an ink composition used should have excellent curability, scratch resistance and visibility when marking is performed in a package substrate or the like.

As defined above, a package substrate means a protective substrate sealing a semiconductor chip or the like. The semiconductor substrate is a semiconductor chip and has a meaning which includes a wafer as a direct substrate. The semiconductor chip or the like is sealed and produced to form an electronic component (IC package). One or more of the electronic components is integrated to form an electronic apparatus.

Examples of standard of package substrate include insertion-type package such as PGA (Pin Grid Array), DIP (Dual Inline Package), SIP (Single Inline Package), ZIP (Zigzag Inline Package), DO (Diode Outline) package, and TO (Transistor Outline) package; and surface mounting type package such as P-BGA (Plastic Ball grid array), T-BGA (Tape Ball grid array), F-BGA (Fine Pitch Ball grid array), SOJ (Small Outline J-leaded), TSOP (Thin Small Outline Package), SON (Small Outline Non-lead), QFP (Quad Flat Package), CFP (Ceramic Flat Package), SOT (Small Outline Transistor), PLCC (Plastic leaded chip carrier), LGA (Land grid array), LLCC (Leadless chip carrier), TCP (Tape carrier package), LLP (Leadless Leadframe Package), and DFN (Dual Flatpack Non-lead).

Examples of a commercially available package substrate include a general logic IC package (SOP14-P-300-1.27A) manufactured by Toshiba Semi-Conductor Co., Ltd., surface mounting package (UPA2350B1G) manufactured by Renesas Electronics Corporation, surface mounting package (P-LFBGA048-0606) manufactured by Sharp Corporation and, and serial EEPROM (BR24L01A) manufactured by ROHM Co., Ltd.

The package substrate includes nonabsorbent material in order to prevent infiltration of ink to the main body of electronic component. Specific examples of the nonabsorbent material is not limited to the following, and include metals such as gold, silver, copper, aluminum, iron-nickel alloy, stainless, and brass; inorganic material such as semiconductor (for example, silicon), carbide, nitride (for example, silicon nitride), and boride, and organic material such as silicone, epoxy resin, phenol resin, polyimide, and polymethyl methacrylate (PMMA).

Of these, silicone or epoxy resin is more preferable as the package substrate in order to have good adhesiveness with ink. Thus, package substrate formed of silicone or epoxy resin is used as sealing materials of electronic components, and therefore the ink composition of the embodiment can be preferably recorded (marking) on the outer face of package substrate.

Examples of a commercially available semiconductor substrate (wafer) include a 300 mm silicon wafer manufactured by Shin-Etsu Chemical Co., Ltd., an SOI wafer manufactured by SUMCO, and a polished wafer manufactured by Covalent Materials Corporation.

Examples of materials of the semiconductor substrate include silicon, germanium and selenium. Of these, silicon is preferable since it has excellent adhesiveness with ink and is very stable as semiconductor material.

Examples of the electronic apparatus include a USB memory, a memory card, an SD memory card, a memory stick, a smart media, an xD picture card, and a flash memory card such as compact flash (registered trademark).

A marking method for package substrates or the like will be described.

When marking is performed on a wafer as a semiconductor substrate, marking may be performed on a wafer before dicing or marking may be performed on a semiconductor chip which is diced into a chip shape after formation of circuits on the wafer. In the latter case, a silicon wafer where an IC (integrated circuit) is formed is to generally form silicon oxide film on the surface of the wafer during circuit formation. Examples of the method for forming a silicon oxide film include a high frequency sputtering method which has excellent control of thickness. The method can be used to sputter, on the silicon wafer, silicon dioxide which is a target material.

In a case of performing marking on a package substrate, marking may be performed on a package substrate after sealing of semiconductor chip, or marking may be performed on a package substrate before sealing of semiconductor chip.

The electronic components are produced by bonding a pad of a semiconductor chip and a lead frame and sealing the whole chip together with a sealing agent in a package substrate. The sealing agent is not limited to the following, but for example includes an epoxy resin, a phenol resin and a silicone resin. Marking can be performed on the surface (outer surface) of the electronic components thus produced.

When the ink composition is applied to a nonabsorbent recording medium, a drying process after irradiation and curing with ultraviolet rays should be provided.

According to the embodiment, an ultraviolet curable ink jet ink composition having excellent ink curability, scratch resistance of the cured ink and visibility of the recorded image can be provided.

Recorded Matter

The embodiment of the invention relates to a recorded matter. The recorded matter is to record the ink composition of the embodiment to a package substrate or the like as a recording medium, which contains the package substrate or the like and a cured material with the ink composition which is recorded on the package substrate or the like. The recorded matter has excellent curability of the ink composition, and the cured ink composition (cured material) which is attached to a package substrate or the like has excellent scratch resistance and visibility of the recorded image.

Ink Jet Recording Method

The embodiment of the present invention relates to an ink jet recording method. The ink jet recording method includes processes of ejecting and attaching the ink composition of the embodiment on a package substrate or the like (recording medium), and of curing the ink composition which is irradiated with ultraviolet rays having an emission peak in the predetermined range. Thus, the ink composition is cured on package substrate or the like, and to thereby form a cured material. The processes will be described in detail below.

Ejecting Process

The ejecting process can use the ink jet recording apparatus of the related art. When the ink composition is ejected, the viscosity is preferably 30 mPa·s or less, more preferably 5 to 20 mPa·s. The ink composition may be ejected at room temperature or in an unheated state as long as the viscosity thereof is adjusted such that the temperature of the composition is at room temperature or in an unheated state. On the other hand, the ink composition may be ejected as long as a viscosity is in the desirable range by heating the composition to the predetermined temperature. Thus, a good ejection stability can be obtained.

Curing Process

Then, in the curing process, the ink composition which is ejected and attached to the package substrate is cured by irradiation with ultraviolet rays.

Specifically, the polymerization reaction of the polymerizable compound starts due to irradiation with ultraviolet rays. Moreover, the ink composition contains a photopolymerization initiator, which is decomposed by irradiation with radiation to generate initiation species such as radicals, acids and bases, and then the initiation species promote a polymerization reaction of the polymerizable compound. In this case, when the ink composition contains a photopolymerization initiator and a sensitizing dye, the sensitizing dye reaches an excitation state by absorption of ultraviolet rays, and contact with the photopolymerization initiator promotes decomposition thereof, curing reaction can be achieved with greater sensitivity.

An ultraviolet source uses a mercury lamp or gas and a solid laser, or the like. Examples of the light source for curing of radiation curable ink jet ink composition include a mercury lamp, or a metal halide lamp, which are widely used. From the viewpoint of current environmental conservation, one free of mercury is strongly demanded, and substitution with a GaN-based semiconductor ultraviolet emitting device is industrially and environmentally very useful. Ultraviolet emitting diodes (UV-LED) and ultraviolet laser diodes (UV-LD) have a small size, high longevity, high efficiency, and low expense, which are expected as a radiation curable ink jet light source. Of these, UV-LEDs are preferable.

A preferable range of emission peak wavelength and irradiation energy by the ultraviolet ray is as described above.

In this case, composition of the ink composition of the embodiment can result in curing at a low energy and a high rate. The irradiation energy is calculated by multiplying irradiation intensity by irradiation time. When the irradiation time can be shortened due to the composition of the ink composition of the embodiment, the recording rate can increase. On the other hand, when the irradiation intensity can be decreased due to the composition of the ink composition of the embodiment, a decrease in apparatus size or lower costs can be realized. For irradiation with ultraviolet rays in this case, a UV-LED is preferably used. The inventors found that when such ink composition contains a photopolymerization initiator decomposed by irradiation with radiation in the wavelength range, and a polymerizable compound initiating polymerization with irradiation by radiation of the wavelength range, curing can be performed at lower energy and high rate. The emission peak wavelength may be have one or plural values in the wavelength range. When plural kinds of wavelength are used, the overall irradiation energy of radiation having the emission peak wavelength is the aforementioned irradiation energy.

According to the present embodiment, an ultraviolet curable ink jet ink composition having excellent ink curability, scratch resistance of the cured ink, and visibility of the recorded image and an ink jet recording method can be provided.

EXAMPLES

A first embodiment of the present invention will be described below by Examples, and is not limited to Examples.
Used Starting Materials
The used starting materials in the Examples and Comparative Examples are as follows.
Polymerizable Compound
  N-vinylcaprolactam (manufactured by BASF, simply referred to as NVC in Table 1)
  VEEA (trade name, 2-(2-vinyloxyethoxy)ethyl acrylate, manufactured by Nippon Shokubai Co., Ltd.), simply referred to as VEEA in Table 1)
  PET3A (trade name, pentaerythritoltriacrylate, manufactured by Osaka Organic Chemical Industry Ltd., simply referred to as PET3A in Table 1)
  PETA-K (trade name, pentaerythritoltetraacrylate, manufactured by DICEL CYTEC COMPANY LTD., simply referred to as PETA-K in Table 1)
  BISCOAT#192 (trade name, phenoxyethylacrylate, manufactured by Osaka Organic Chemical Industry Ltd., simply referred to as PEA Table 1)
Photopolymerization Initiator
  IRGACURE 819 (trade name, manufactured by BASF, bis(2,4,6-trimethylbenzoyl)-phenylphosphineoxide, solid content 100%, simply referred to as 819 in Table 1)
  DAROCURE TPO (trade name, manufactured by BASF, 2,4,6-trimethylbenzoyl-diphenyl-phosphineoxide, solid content 100%, simply referred to as TPO in Table 1)
Slipping Agent
  silicone-based surfactant BYK-UV3500 (trade name polydimethylsiloxane having a polyether-modification acryl group, manufactured by BYK, simply referred to as UV3500 in Table 1)
Polymerization Inhibitor
  p-methoxyphenol (manufactured by KANTO CHEMICAL CO., INC, simply referred to as MEHQ in Table 1)
Pigment
  R-630 (trade name, titanium oxide, manufactured by ISHIHARA SANGYO KAISHA, LTD., simply referred to as oxide Ti in Table 1)
Dispersing Agent
  Solsperse 36000 (trade name, manufactured by LUBRIZOL, simply referred to as Sol36000 in Table 1)
Substrate
  substrate 1 (package substrate): epoxy resin face1 (manufactured by Sharp Corporation, surface-mounted package, Model No. "P-LFBGA048-0606")
  substrate 2 (package substrate): epoxy resin face2 (manufactured by Rohm Semiconductor, serial EEPROM, Model No. "BR24L01A")
  substrate 3 (semiconductor substrate): silicon face1 (manufactured by Shin-Etsu Chemical Co., Ltd., 300 mm silicon wafer)
  substrate 4 (semiconductor substrate): silicon face2 (manufactured by SUMCO, SOI wafer)
  The substrates 3 and 4 were used as one which forms a circuit to be diced into a semiconductor chip. When a circuit is formed, a thickness of a silicon oxide layer on the surface of the wafer was 50 nm.

Examples 1 to 14, Comparative Examples 1 to 6

Components described in Table 1 are added so as to have a composition (unit: % by mass) described in Table 1, which was mixed and stirred at room temperature for 1 hour, followed by complete dissolution. The resultant was filtered with 5 μm of membrane filter, to obtain a radiation curable ink jet ink composition.

Each of the substrates 1 to 4 was pretreated at the presence of lower pressure mercury. A solid pattern image was printed on the pretreated package substrate or semiconductor substrate, so as to have a thickness of the printed matter of 10 μm, using an ink jet printer (PX-7550S (trade name), manufactured by Seiko Epson Corporation, and thus ink was cured by irradiation with radiation under the following conditions. The irradiation condition of radiation-ray includes wavelength of 395 nm, irradiation intensity of 400 mW/cm$^2$, and maximum integrated irradiation energy of 600 mJ/cm$^2$. The solid pattern image is an image which dots are recorded with respect to a given pixel of all of the pixels in a minimum recording unit region specified by a recording resolution.

The following evaluations were performed at room temperature with respect to the obtained recorded matter, that is to say one where ink is recorded on a package substrate or semiconductor substrate to form a cured film (coating film).

Evaluation Items

With respect to the radiation curable ink jet ink composition produced in each of the Examples and Comparative Examples, adhesiveness, scratch resistance and alcohol resistance were evaluated by the following methods.

Adhesiveness

According to JIS K-5600-5-6 (ISO2409) (coating material—general test procedures—Chapter 5: mechanical property of coating film-Section 6: Adhesive property (cross cutting method), adhesiveness of image formed by solid printing to the substrates 1 to 4 was evaluated. The cross-cutting method will be described.

A single blade tool (generally commercially available cutter) as a cutting tool and a guide for cutting a substrate at regular intervals, using the single blade tool were prepared.

A cutting tool is displaced in vertical to a coating film, in which six cuts are made in a recorded matter. After cutting, a direction is changed at 90°, and a further six cuts are made so as to be vertical to the cuts.

Then, a transparent adhesive tape (width of 25±1 mm) was detached in a length of about 75 mm, the tape is attached to a portion cut in a lattice pattern formed on the coating film, the coating film was sufficiently scrubbed with fingers so as to be shown transparently shape, followed by detachment at 0.5 to 1.0 seconds in an angle of around 60° within 5 minutes after attachment.

The evaluation criteria are as follows. 'A' and 'B' are evaluation criteria acceptable in practical use. Evaluation results are shown in Table 1.
A: detachment does not occur in any of intersections of lattice
B: detachment occurs in a portion of lattice
C: detachment occurs in 50% or higher lattice
D: detachment occurs on the whole surface of lattice.

Scratch Resistance

Detachment of a coated film was confirmed using a load changing-type friction and abrasion testing system (Tribogear TYPE-HHS2000, trade name, manufactured by SHINTO Scientific Co., Ltd.). When an image formed by solid printing was scratched with a 0.2 mm sapphire needle, the load conditions were maintained constantly, detachment of coating film was confirmed.

Evaluation criteria are as follows. 'A' and 'B' are evaluation criteria acceptable in practical use. Evaluation results are shown in Table 1.
A: defect and detachment in a coating film do not occur.
B: defects occur in a portion of coated film, and detachment does not occur.
C: defects occur in a portion of coated film, and coating film is detached.
D: defects occur over the entire surface of coating film, and coating film is detached.

Alcohol Resistance

The obtained recorded matter was immersed in isopropyl alcohol solution for 1 minute. Then, the recorded matter was taken out from solution, detachment of coating film was confirmed at the same condition as the scratch resistance evaluation.

Evaluation criteria are as follows. A and B are evaluation criteria acceptable in practical use. Evaluation results are shown in Table 1.
A: defects and detachment in a coating film do not occur.
B: defects occur in a portion of coating film, and detachment does not occur.
C: defects occur in a portion of coating film, and coating film is detached.
D: defects occur over the entire surface of coating film, and coating film is detached.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Polymerizable compound | NVC | 10.0 | 10.0 | 9.6 | 5.0 | 13.0 | 9.1 | 15.0 | 9.1 | 12.0 | 10.0 |
| | VEEA | 38.0 | 40.0 | 42.0 | 50.0 | 20.0 | 43.0 | 20.0 | 43.0 | 45.0 | 38.0 |
| | PET3A | 15.0 | 5.0 | 12.0 | 11.6 | 20.0 | — | 18.0 | 12.0 | — | 15.0 |
| | PETA-K | — | — | — | — | — | 12.0 | — | — | — | — |
| | PEA | 5.6 | 13.6 | 5.0 | 2.0 | 15.6 | 4.5 | 15.6 | 4.5 | 11.6 | 5.6 |
| Photopolymerization Initiator | 819 | 4.0 | 4.0 | 4.0 | 4.0 | 4.0 | 4.0 | 4.0 | 4.0 | 4.0 | 4.0 |
| | TPO | 5.0 | 5.0 | 5.0 | 5.0 | 5.0 | 5.0 | 5.0 | 5.0 | 5.0 | 5.0 |
| Slipping agent | UV3500 | 0.2 | 0.2 | 0.2 | 0.2 | 0.2 | 0.2 | 0.2 | 0.2 | 0.2 | 0.2 |
| Polymerization Inhibitor | MEHQ | 0.15 | 0.15 | 0.15 | 0.15 | 0.15 | 0.15 | 0.15 | 0.15 | 0.15 | 0.15 |
| Pigment | Ti Oxide | 20.0 | 20.0 | 20.0 | 20.0 | 20.0 | 20.0 | 20.0 | 20.0 | 20.0 | 20.0 |
| Dispersant | Sol 36000 | 2.0 | 2.0 | 2.0 | 2.0 | 2.0 | 2.0 | 2.0 | 2.0 | 2.0 | 2.0 |
| Total | | 100.0 | 100. | 100.0 | 100.0 | 100.0 | 100.0 | 100.0 | 100.0 | 100.0 | 100.0 |
| Substrate | | 1 | 1 | 1 | 1 | 1 | 1 | 1 | 1 | 1 | 2 |
| Adhesiveness | | A | A | A | A | A | A | A | A | B | A |
| Scratch resistance | | A | A | A | A | A | A | A | A | B | A |
| Alcohol Resistance | | A | A | A | A | A | A | A | A | B | A |

| | | Example 11 | Example 12 | Example 13 | Example 14 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Polymerizable compound | NVC | 10.0 | 10.0 | 15.0 | 10.0 | 7.6 | 25.0 | 20.0 | 10.0 | 3.0 | 15.0 |
| | VEEA | 38.0 | 38.0 | 35.0 | 20.0 | 55.0 | — | 30.0 | 15.0 | 33.0 | 15.0 |
| | PET3A | 15.0 | 15.0 | 2.0 | 25.0 | 6.0 | 29.0 | 10.0 | 13.6 | 5.0 | 25.0 |
| | PETA-K | — | — | — | — | — | 14.6 | — | — | — | — |
| | PEA | 5.6 | 5.6 | 16.6 | 13.6 | — | 14.6 | 8.6 | 30.0 | 27.6 | 13.6 |

TABLE 1-continued

| | | | | | | | | | | | |
|---|---|---|---|---|---|---|---|---|---|---|---|
| Photopolymerization | 819 | 4.0 | 4.0 | 4.0 | 4.0 | 4.0 | 4.0 | 4.0 | 4.0 | 4.0 | 4.0 |
| Initiator | TPO | 5.0 | 5.0 | 5.0 | 5.0 | 5.0 | 5.0 | 5.0 | 5.0 | 5.0 | 5.0 |
| Slipping agent | UV3500 | 0.2 | 0.2 | 0.2 | 0.2 | 0.2 | 0.2 | 0.2 | 0.2 | 0.2 | 0.2 |
| Polymerization Inhibitor | MEHQ | 0.15 | 0.15 | 0.15 | 0.15 | 0.15 | 0.15 | 0.15 | 0.15 | 0.15 | 0.15 |
| Pigment | Ti Oxide | 20.0 | 20.0 | 20.0 | 20.0 | 20.0 | 20.0 | 20.0 | 20.0 | 20.0 | 20.0 |
| Dispersant | Sol 36000 | 2.0 | 2.0 | 2.0 | 2.0 | 2.0 | 2.0 | 2.0 | 2.0 | 2.0 | 2.0 |
| Total | | 100.0 | 100. | 100.0 | 100.0 | 100.0 | 100.0 | 100.0 | 100.0 | 100.0 | 100.0 |
| Substrate | | 3 | 4 | 1 | 1 | 1 | 1 | 1 | 1 | 1 | 1 |
| Adhesiveness | | A | A | B | B | D | D | C | C | C | C |
| Scratch resistance | | A | A | B | B | D | D | C | C | B | C |
| Alcohol Resistance | | A | A | B | B | D | D | C | C | C | C |

From Table 1, when the content of each of the monomer A and N-vinylcaprolactam is in the predetermined range (Example), it is understood that a radiation curable ink jet ink composition having excellent adhesiveness, scratch resistance, and alcohol resistance was obtained, as compared to a case where it is outside the predetermined range (Comparative Example). In addition, when the contents of pentaerythritoltriacrylate and pentaerythritoltetraacrylate are within the predetermined range (Examples 1 to 8, 10 to 12), it is understood that an ink composition which have superior adhesiveness, scratch resistance, and alcohol resistance was obtained, as compared to a case where they are not included therein or a case where they are outside the predetermined range (Examples 9, 13, 14).

The second embodiment of the present invention will be described below by Examples, and is not limited to Examples.

Used Starting Materials

The used starting materials in the Examples and Comparative Examples are as follows Photopolymerization Initiator IRGACURE 819 (Trade name, manufactured by BASF, bis(2,4,6-trimethylbenzoyl)-phenylphosphineoxide, simply referred to as 819 in Table 1)

DAROCURE TPO (Trade name, manufactured by BASF, 2,4,6-trimethylbenzoyl-diphenyl-phosphineoxide, simply referred to as TPO in Table 1)

Pigment (Titanium Oxide)

Tipaque (registered trademark) CR-60-2 (trade name, manufactured by ISHIHARA SANGYO KAISHA, LTD.), simply referred to as CR60-2 in Table 1)

Tipaque (registered trademark) PF-711 (trade name, manufactured by ISHIHARA SANGYO KAISHA, LTD., simply referred to as PF-711 in Table 1)

Tipaque (registered trademark) CR-58-2 (trade name, manufactured by ISHIHARA SANGYO KAISHA, LTD., simply referred to as CR58-2 in Table 1)

Dispersing Agent

Solsperse 36000 (trade name, manufactured by Noveon)

Polymerization Inhibitor p-methoxyphenol (trade name, manufactured by KANTO CHEMICAL CO., INC), simply referred to as MEHQ in Table 1)

Surfactant

BYK-3500 (trade name, manufactured by BYK-Chemie, polysiloxane, both ends, simply referred to as BYK3500 in Table 1)

Polymerizable Compound

VEEA (trade name, 2-(2-vinyloxyethoxy)ethyl acrylate, manufactured by Nippon Shokubai Co., Ltd.), simply referred to as VEEA in Table 1)

V-CAP (trade name, N-vinylcaprolactam, manufactured by ISP, simply referred to as NVC in Table 1)

BISCOAT#192 (trade name, phenoxyethylacrylate, manufactured by Osaka Organic Chemical Industry Ltd., simply referred to as PEA in Table 1)

SR-444 (trade name, pentaerythritoltriacrylate, manufactured by Sartomer Co., simply referred to as PETA in Table 1)

Substrate

Substrate 1 (package substrate): epoxy resin face1 (manufactured by Sharp Corporation, surface-mounted package, Model No. "P-LFBGA048-0606")

Substrate 2 (semiconductor substrate): silicone face 2 (manufactured by SUMCO, SOI wafer)

Substrate 3 (other substrate): RUMIRER (registered trademark) E20#125 (trade name, manufactured by Toray Industries Inc., biaxially-stretched polyester (PET) film, while grade, thickness 125 μm)

The substrate 2 used is one on which a circuit is formed and is diced into semiconductor chips. When a circuit is formed, a thickness of a silicon oxide layer on the surface of the wafer was 50 nm.

Examples 1 to 6, Comparative Examples 1 to 6

Production of Pigment Dispersion

Before production of the ink composition, a pigment dispersion was produced. 60% by mass of titanium oxide, 5% by mass of dispersant, and 35% by mass of VEEA as a polymerizable compound were mixed respectively and thus stirred with a stirrer for 1 hour. A mixed solution after stirring was dispersed with a bead mill, to obtain a pigment dispersion. Dispersion conditions are filled with 70% filling rate using a zirconia beads having a diameter of 0.65 mm, a scanning rate of 9 m/s, dispersion time of 2 to 4 hours were used.

Production of Ink Composition

Components described in Table 2 were added so as to have a composition (unit: % by mass) described in Table 2 (in Table 1, pigment and a portion of VEEA were added as the aforementioned pigment dispersion), which was mixed and stirred at room temperature for 1 hour, followed by complete dissolution. The resultant was filtered with 5 μm of membrane filter, to obtain an ultraviolet-curable ink jet ink composition.

In Table 2, since the pigment dispersion is calculated based on a content of solid pigment and VEEA, a dispersion agent is not described. Blank of Table 2 means non-addition.

TABLE 2

| | | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Photopolymerization initiator | 819 | 4 | 4 | 4 | 4 | 4 | 4 | 4 | 4 | 4 | 4 | 4 | 4 |
| | TPO | 5 | 5 | 5 | 5 | 5 | 5 | 5 | 5 | 5 | 5 | 5 | 5 |
| Pigment | CR60-2 | 12 | 15 | 18 | 15 | 15 | 15 | 5 | 25 | | | | |
| | PF-711 | | | | | | | | | | 12 | | |
| | CR58-2 | | | | | | | | | 12 | | 5 | 25 |
| Polymerization Inhibitor | MEHQ | 0.1 | 0.1 | 0.1 | 0.1 | 0.1 | 0.1 | 0.1 | 0.1 | 0.1 | 0.1 | 0.1 | 0.1 |
| Surfactant | BYK-3500 | 0.2 | 0.2 | 0.2 | 0.2 | 0.2 | 0.2 | 0.2 | 0.2 | 0.2 | 0.2 | 0.2 | 0.2 |
| Polymerizable compound | VEEA | 39.6 | 39.6 | 39.6 | 39.6 | 39.6 | 39.6 | 39.6 | 39.6 | 39.6 | 39.6 | 39.6 | 39.6 |
| | NVC | 8.0 | 8.0 | 8.0 | 5.0 | 20.0 | 25.0 | 8.0 | 8.0 | 8.0 | 8.0 | 8.0 | 8.0 |
| | PEA | 16.2 | 13.2 | 10.2 | 16.2 | 7.2 | 2.2 | 23.2 | 3.2 | 16.2 | 16.2 | 23.2 | 3.2 |
| | PETA | 14.9 | 14.9 | 14.9 | 14.9 | 14.9 | 14.9 | 14.9 | 14.9 | 14.9 | 14.9 | 14.9 | 14.9 |
| Total | | 100 | 100 | 100 | 100 | 100 | 100 | 100 | 100 | 100 | 100 | 100 | 100 |

Evaluation Item

With respect to the ultraviolet curable ink jet ink composition produced in each of the Examples and Comparative Examples, the median size of titanium oxide, curability, scratch resistance, brightness, and preservation stability were evaluated by the following method.

Median Size

Using a dynamic light scattering method, the median size of titanium oxide in the ink composition was measured. As pretreatment, each ink composition was diluted with diethyleneglycol diethylether, and obtained liquid was used in blank test for measurement. Examples of measuring apparatus include dynamic light scattering method type particle size distribution measuring apparatus LB-550, manufactured by HORIBA, Ltd.

Curability

The ultraviolet curable ink jet ink composition was filled in each nozzle array using ink jet printer PX-G5000 (trade name, manufactured by Seiko Epson Corporation). At room temperature and normal pressure, a solid pattern image was printed at the conditions of recording resolution of 720 dpi× 720 dpi and drop weight of 7 ng on the substrate 1. The solid pattern image is an image which dots are recorded with respect to a given pixel of all of the pixels in a minimum recording unit region specified by a recording resolution.

In addition to the aforementioned printing, the irradiation intensity from a UV-LED in an ultraviolet irradiation apparatus mounted laterally in a carriage is 400 mW/cm², and a solid pattern image was cured with irradiation of ultraviolet rays having a wavelength of 395 nm. In a finger-contact test, an image is assessed as cured when tackiness of image (surface of coating film) goes away.

Evaluation was performed by calculating irradiation energy of ultraviolet ray which is required in curing. The irradiation energy [mJ/cm²] is determined such that irradiation intensity [mW/cm²] was measured on the surface of irradiated from light source, which is multiplied by irradiation duration time [s]. The irradiation intensity was measured using ultraviolet ray intensity measuring unit UM-10, light receiving section UM-400 (all manufactured by KONICA MINOLTA SENSING, INC.).

Evaluation criteria are as follows. 'A' and 'B' are evaluation criteria acceptable in practical use. Evaluation results are shown in Table 3.
A: less than 300 mJ/cm²
B: equal to or more than 300 mJ/cm² and less than 500 mJ/cm²
C: 500 mJ/cm² or more Scratch Resistance Printing and curing of solid pattern image with regard to the same items as evaluation items of the curability were performed with respect to the substrates 1 to 3. Detachment of a coating film was confirmed using a Load changing type friction and abrasion testing system (Tribogear TYPE-HHS2000, trade name, manufactured by SHINTO Scientific Co., Ltd.). When a pattern image after curing with a 0.2 mm sapphire needle was scratched, load conditions were set to 150 gf, and detachment of coating film was confirmed.

Evaluation criteria are as follows. 'A' and 'B' are evaluation criteria acceptable in practical use. Evaluation results are shown in Table 1.
A: defects and detachment in a coating film do not occur.
B: defects occur in a coating film, and detachment does not occur.
C: defects occur in a coating film, and coating film is detached.

Brightness

Printing and curing of solid pattern image with respect to the same items as evaluation items of the curability were performed with respect to substrate 1 (black substrate). A brightness of solid pattern image on a substrate 1 was measured using a colorimeter (AG Type Spectrolino, manufactured by GretagMacbeth). It is determined whether visibility of image is deteriorated depending on such brightness. Evaluation criteria are as follows. 'A' and 'B' are evaluation criteria acceptable in practical use. 50 of brightness is a value of level which can recognize minimum white on a black package. Evaluation results are shown in Table 3.
A: brightness of 60 or more
B: brightness equal to or more than 50 and less than 60
C: brightness less than 50

Preservation Stability

Each ink composition was added by 24 mL in 30 mL of glass bottle, and was left to stand at 50° C. for 14 days while shielding. The value of ink viscosity after leaving was measured with respect to ink viscosity before leaving, and thus the ink thickening rate before and after leaving was calculated, which evaluate a preservation stability of the ink.

Evaluation criteria are as follows. 'A' and 'B' are practically acceptable evaluation criteria. Evaluation results are shown in Table 3.
A: less than 10%
B: equal to or more than 10% and less than 20%
C: 20% or more

TABLE 3

| | Median size | Curability | Scratch resistance Substrate 1 | Substrate 2 | Substrate 3 | brightness Substrate 1 | Preservation stability |
|---|---|---|---|---|---|---|---|
| Example1 | 260 nm | A | A | A | C | B | A |
| Example2 | 250 nm | A | A | A | C | A | A |
| Example3 | 260 nm | A | B | B | C | A | A |
| Example4 | 250 nm | B | A | A | C | A | A |
| Example5 | 250 nm | A | A | A | C | A | A |
| Example6 | 250 nm | A | A | A | C | A | B |
| Comparative Example1 | 250 nm | C | A | A | C | C | A |
| Comparative Example2 | 260 nm | C | C | C | C | A | A |
| Comparative Example3 | 280 nm | B | C | C | C | B | A |
| Comparative Example4 | 330 nm | C | C | C | C | B | A |
| Comparative Example5 | 330 nm | B | B | B | C | C | A |
| Comparative Example6 | 330 nm | C | C | C | C | A | A |

From Table 3, it is understood that an ultraviolet-curable type ink jet ink composition which contains a polymerizable compound, a photopolymerization initiator, titanium oxide having a median size and content in the predetermined range, which is used for recording the ink composition on a package substrate or semiconductor substrate as a recording medium, has excellent curability of ink and preservation stability, scratch resistance of the cured ink, and visibility (brightness) of recorded image.

More specifically, when the median size of pigment (titanium oxide) is not higher than 260 nm (Examples), it is understood that it has excellent curability and scratch resistance, as compared to a pigment having a median size of higher than 260 nm. When the content of pigment (titanium oxide) is within a range of 12 to 18% by mass (each of the Examples), it is understood that it has excellent curability, scratch resistance and visibility as compared to a case where it is outside the aforementioned range (Comparative Examples 1, 2, 5, 6).

An image which is printed the ink composition of Examples on a substrate 1 as a package substrate, and a substrate 2 as a semiconductor substrate has excellent scratch resistance as compared to an image printed on not a package substrate and semiconductor substrate but a substrate 3.

What is claimed is:

1. A radiation curable ink jet ink composition comprising:
a monomer equal to or more than 20% by mass and equal to or less than 50% by mass with respect to the total mass of the ink composition, which is represented by the following formula (I); and
N-vinylcaprolactam equal to or more than 5% by mass and equal to or less than 15% by mass with respect to the total mass of the ink composition:

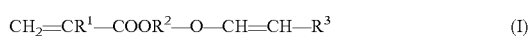

$$CH_2=CR^1-COOR^2-O-CH=CH-R^3 \quad (I)$$

wherein, $R^1$ is a hydrogen atom or a methyl group, $R^2$ is a divalent organic residue having 2 to 20 carbon atoms, and $R^3$ is a hydrogen atom or monovalent organic residue having 1 to 11 carbon atoms.

2. The radiation curable ink jet ink composition according to claim 1, wherein the monomer is 2-(vinyloxyethoxy)ethyl acrylate.

3. The radiation curable ink jet ink composition according to claim 1, wherein the radiation curable ink jet ink composition further contains a polyfunctional acrylate equal to or more than 5% by mass and equal to or less than 20% by mass with respect to the total mass of the ink composition.

4. The radiation curable ink jet ink composition according to claim 3, wherein the polyfunctional acrylate is a polyfunctional acrylate having a pentaerythritol skeleton.

5. The radiation curable ink jet ink composition according to claim 1, wherein the radiation curable ink jet ink composition further contains a photopolymerization initiator.

6. The radiation curable ink jet ink composition according to claim 1, wherein a recording medium to which the ink composition is attached is a package substrate or semiconductor substrate.

7. A recorded matter comprising:
the package substrate or semiconductor substrate as a recording medium; and
a cured material of the radiation curable ink jet ink composition according to claim 1 recorded on the package substrate or the semiconductor substrate.

8. An ink jet recording method comprising:
ejecting the radiation curable ink jet ink composition according to claim 1 onto a recording medium; and
curing the ejected ink composition by irradiation with active radiation rays having an emission peak wavelength in a range of equal to or longer than 350 nm and equal to or shorter than 400 nm.

* * * * *